(12) United States Patent
Houdek et al.

(10) Patent No.: US 7,305,497 B2
(45) Date of Patent: Dec. 4, 2007

(54) PERFORMING RESOURCE ANALYSIS ON ONE OR MORE CARDS OF A COMPUTER SYSTEM WHEREIN A PLURALITY OF SEVERITY LEVELS ARE ASSIGNED BASED ON A PREDETERMINED CRITERIA

(75) Inventors: Ryan Ray Houdek, Fort Collins, CO (US); Toran Kent Kopren, Fort Collins, CO (US); Wade James Satterfield, Fort Collins, CO (US)

(73) Assignee: Hewlett-Packard Development, L.P., Houston, TX (US)

( * ) Notice: Subject to any disclaimer, the term of this patent is extended or adjusted under 35 U.S.C. 154(b) by 423 days.

(21) Appl. No.: 10/852,984

(22) Filed: May 24, 2004

(65) Prior Publication Data

US 2005/0262335 A1 Nov. 24, 2005

(51) Int. Cl.
*G06F 13/00* (2006.01)
*G06F 7/04* (2006.01)

(52) U.S. Cl. .................. 710/15; 710/16; 710/17; 710/18; 710/200; 713/1; 713/2; 713/159; 726/26; 726/27

(58) Field of Classification Search ............ 710/15–18, 710/200; 713/1, 2, 159; 726/26, 27
See application file for complete search history.

(56) References Cited

U.S. PATENT DOCUMENTS

| 7,024,695 | B1 * | 4/2006 | Kumar et al. ............... 726/26 |
| 7,249,381 | B2 * | 7/2007 | Telesco ...................... 726/27 |
| 2005/0228916 | A1 * | 10/2005 | Telesco ..................... 710/200 |

* cited by examiner

Primary Examiner—Tammara Peyton

(57) ABSTRACT

A method of performing resource analysis on one or more cards of a computer system is described and disclosed. In an embodiment, the method includes identifying one or more affected hardware identifiers. Each affected hardware identifier corresponds to any of the cards. Configuration information of the computer system is gathered. Moreover, the configuration information is used to analyze the affected hardware identifiers to identify any affected resource of the computer system. The identification of any affected resource is independent of a system-wide hardware scan of the computer system. Furthermore, one of a plurality of severity levels is assigned to each identified affected resource based on predetermined criteria. The severity levels include a low severity level, a medium severity level, and a high severity level. Each severity level represents degree of impact to the computer system if functionality of the identified affected resource became unavailable.

21 Claims, 6 Drawing Sheets

600

ENHANCED CRITICAL RESOURCE ANALYSIS REPORT
--------------------------------------------------
Overall Result: SYSTEM CRITICAL resources will be affected
Reason: resources considered essential for system operation
Date: Thu February 24 15:06:06 2004     605

Hardware Identifiers Analyzed:
    0/0/1/1 - SCSI C896 Ultra Wide Single-Ended
    0/0/2/0 - SCSI C87x Ultra Wide Single-Ended

SYSTEM CRITICAL RESULTS----------------------

FILE SYSTEM ANALYSIS
    Result: system critical file system is mounted via an affected device
        Affected System Critical File Systems:

/
            /usr     610

SWAP ANALYSIS
    Result: an affected device is used for swap
        Affected Swap:
            /dev/vg00/1vol2
            0/8/0/0.8.0.5.0.0.1     (/dev/dsk/e8t0d1)
            /var/paging
            /opt/paging
            /paging

DATA CRITICAL RESULTS----------------------

FILE SYSTEM ANALYSIS
    Result: a data critical file system is mounted via an affected device
        Affected Data Critical File Systems:
            /tmp
            /tmp/test1     620
            /tmp/mirrir1v
            /opt
            /tmp/fs NETWORKING ANALYSIS
    Result: network ports will be affected
        Affected Network Ports:
            0/0/0/0     IP Address:
PROCESS ANALYSIS
Result: a process has open files on affected devices
Affected Processes:
            1           init
            2270        getty
            1068        sendmail
            3675        sysstatem
            10511       httpd
            12984       ksh
            10292       vi
            10285       vi
            23979       httpd

WARNING RESULTS--------------------------     630

LOGICAL VOLUME ANALYSIS
    Result: logical volume manager configuration on affected devices
        Affected Logical Volumes:
            /dev/vg00/1vol1
            /dev/tstera/1vpvg
            /dev/tstno1v          (volume group with affected disk but no affected volumes)
            /dev/vgbigdsk/1/1vbigdsk1    (unused logical volume)
            /dev/vx/dsk/rootdg/vol1      (unused logical volume)
    DUMP ANALYSIS
    Result: an affected device is used for dump
        Affected Dump:
            /dev/vg00/dump1v FILE SYSTEM ANALYSIS
    Result: no CDFS file systems will be affected NETWORKING ANALYSIS
    Result: no other network ports will be affected --------------------------------------------------
END OF ENHANCED CRITICAL RESOURCE ANALYSIS REPORT

FIG. 6

PERFORMING RESOURCE ANALYSIS ON ONE OR MORE CARDS OF A COMPUTER SYSTEM WHEREIN A PLURALITY OF SEVERITY LEVELS ARE ASSIGNED BASED ON A PREDETERMINED CRITERIA

BACKGROUND OF THE INVENTION

1. Field of the Invention

The present invention generally relates to performing resource analysis on a system such as a computer system. More particularly, the present invention relates to performing resource analysis on one or more cards of a computer system to determine if it is safe to perform an online card operation while the computer system is running.

2. Related Art

Systems such as computer systems (e.g., servers) are utilized in a variety of applications. Some systems (e.g., servers executing purchase transactions for an Internet-based merchant) are required to have a high-availability design. That is, these systems need to be running and available at all times. Thus, the need for powering down and rebooting these systems for any reason (e.g., maintenance, upgrades, system crashes, troubleshooting, etc.) has to be avoided as much as possible. Typically, these systems have a plurality of slots, wherein a card is coupled to the slot. Devices (e.g., mass storage device) and network ports are examples of components that can operate off the card. Generally, one or more devices can be coupled to the card via cables.

To maintain high-availability, online card operation capability has been integrated into these systems. The online card operation capability enables a user (e.g., a system administrator) to perform online card operations without powering down and rebooting these systems. Examples of online card operations include adding a card to the system by coupling it to a slot, replacing an existing card that is coupled to a slot with another card, and removing a card from the system by uncoupling it from a slot while the system is running. These online card operations generally require that particular drivers be suspended and that the power to the slot(s) of interest be shut-off before a card can be added, replaced, or removed. Generally, slot power control and drivers facilitate these online card operations. In some systems, several slot power domains are configured, wherein slots in each slot power domain share a power line. If an online card operation will be performed on any slot in a slot power domain, then all the slots in the slot power domain will lose power, increasing the complexity of performing the online card operation.

Before the online card operation is performed, typically a resource analysis is performed. This resource analysis is also useful when groups of cards are taken offline in a single operation such as when an entire chassis of cards is removed from the system while the system is running. Typically, this resource analysis is also referred to as a "critical resource analysis" (CRA). The CRA analyzes and reports the impact of powering down each slot associated with any card that is involved in any attempted online card operation (e.g., adding, replacing, or removing card(s)). This requires identifying affected resources of the system. Conventionally, the identified affected resources are assigned a low severity level (or warning level) or a high severity level (or critical level). If the identified affected resources are essential for system operation, they are assigned the critical level. This indicates that if the slot(s) is powered down causing the unavailability of the functionality of the card(s) coupled to it, the system likely will crash or enter an unhealthy/failed state. The user is generally prevented from performing the online card operation if an identified affected resource is assigned the critical level so that the system keeps running to maintain the desired system availability level. The determination of whether an identified affected resource is "essential for system operation" may vary among different systems. If the identified affected resources are not essential for system operation, they are assigned the warning level. This indicates that if the slot(s) is powered down causing the unavailability of the functionality of the card(s) coupled to it, the system likely will not crash or enter an unhealthy/failed state.

In general, CRA performs a series of checks to conclude if the card and/or slot and the resources/devices associated with it are essential to system operation. The CRA functionality is intended to keep the system running and avoid inadvertent reboots as well as prevent the system from getting into an unhealthy state.

SUMMARY OF THE INVENTION

A method of performing resource analysis on one or more cards of a computer system is described and disclosed. In an embodiment, the method includes identifying one or more affected hardware identifiers. Each affected hardware identifier corresponds to any of the cards. Configuration information of the computer system is gathered. Moreover, the configuration information is used to analyze the affected hardware identifiers to identify any affected resource of the computer system. The identification of any affected resource is independent of a system-wide hardware scan of the computer system. Furthermore, one of a plurality of severity levels is assigned to each identified affected resource based on predetermined criteria. The severity levels include a low severity level, a medium severity level, and a high severity level. Each severity level represents degree of impact to the computer system if functionality of the identified affected resource became unavailable.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 6 illustrates an enhanced CRA report in accordance with an embodiment of the present invention.

DETAILED DESCRIPTION OF THE INVENTION

Figure 1:
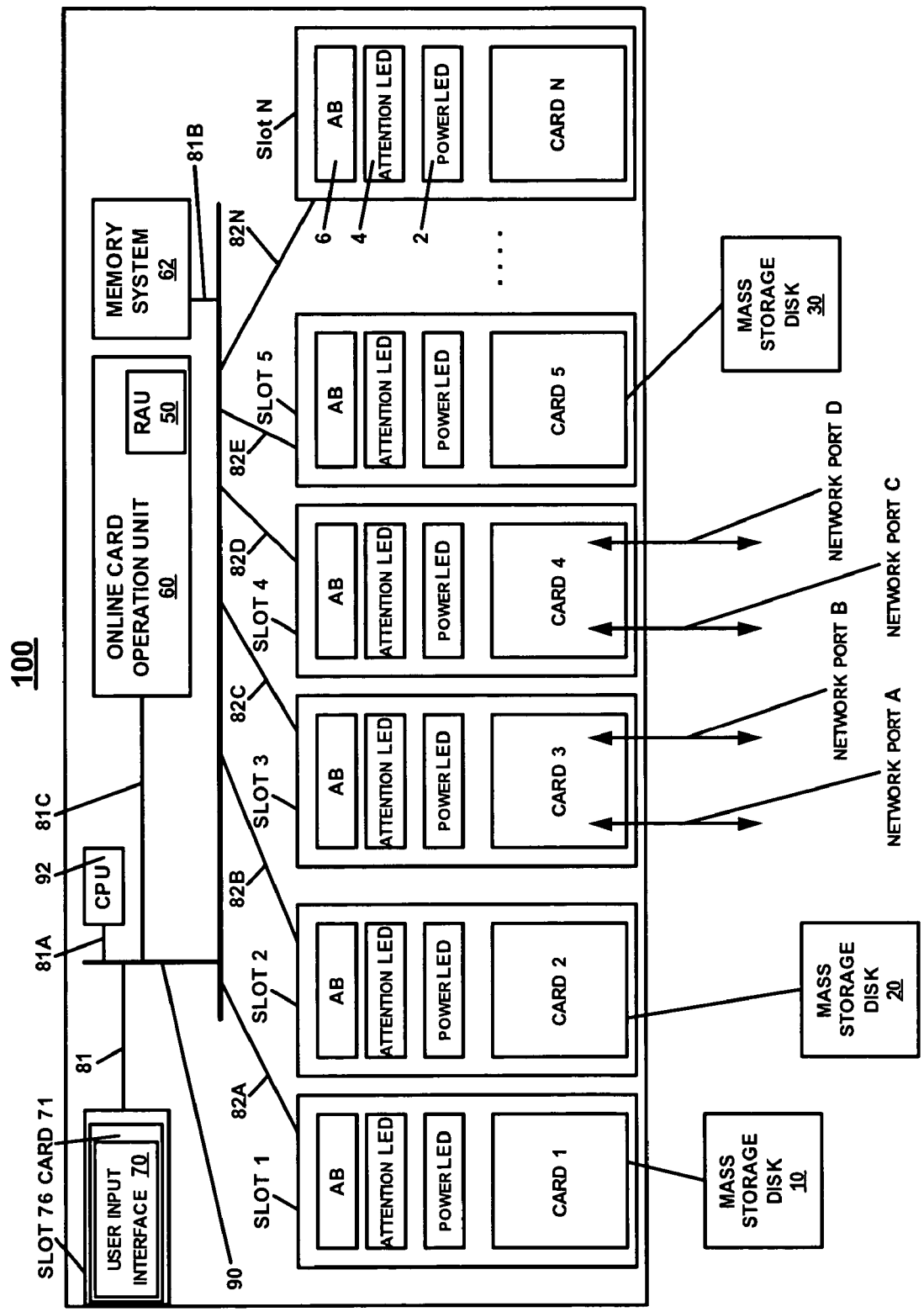
FIG. 1 illustrates a system in accordance with an embodiment of the present invention, showing a resource analysis unit (RAU).

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Overview

A new paradigm for performing resource analysis on cards of a system is described. The old paradigm used information associated with the cards of interest and information from a system-wide hardware scan on the system to identify affected resources and then classified the degree of impact of each affected resource on the system by checking whether the affected resource was part of any critical system configuration. Unlike the old paradigm, the new paradigm focuses on gathering system configuration information and then identifying and classifying affected resources using particular information including system configuration information and information associated with the cards of interest. Under the new paradigm, the resource analysis requires less information to identify and classify the affected resources. Moreover, this resource analysis uses the system configuration information at the beginning of the analysis rather than at the end of the analysis. In the old paradigm or in the new paradigm, low level commands can be utilized. Unlike the old paradigm, the new paradigm enables performance of the resource analysis independently of the low level command required to initiate the system-wide hardware scan on the system, providing a speed enhancement.

Continuing, resource analysis under the new paradigm uses the approach of gathering system configuration information and determining if any configured resource (identifiable from the system configuration information) is affected based on information from the cards of interest. In general, the configured resources would be part of the system configuration information. Unconfigured resources would not be part of the system configuration information and would be unaffected with respect to the resource analysis under the new paradigm. This avoids the requirement for system-wide hardware scan and other procedures that are performance inhibitors.

Enhanced CRA

The resource analysis of the present invention (which will be referred as "enhanced CRA") provides enhanced features compared to the conventional CRA and has several advantages over the conventional CRA.

The conventional CRA is deficient in several ways. The conventional CRA initially performs a hardware scan on the system. Typically, the hardware scan is a system-wide scan that discovers and reports information about each hardware component of the system and its status. In a HP-UX system platform, the hardware scan is performed by using the "IOSCAN" command. Examples of the reported information are: the location of the hardware components (e.g., peripheral devices) via hardware identifiers, the device files related to the hardware components, the drivers that are being used by the hardware components, status of the hardware components, and a brief description of each hardware component. A hardware identifier is generally used by the operating system to address devices attached to a card coupled to a slot. In a HP-UX system platform, the hardware identifier is a hardware path.

Continuing, the hardware scan can be slow and time-consuming if the system has many hardware components. The larger the number of hardware components the longer the time needed to complete the hardware scan. Hence, the conventional CRA can take many minutes (e.g., 20 minutes) and even up to an hour to complete. Moreover, the conventional CRA functionality is generally available only via a graphical user interface (GUI). Users with access only to a command line interface cannot access the conventional CRA functionality. Moreover, when the conventional CRA functionality is accessed from a remote location, the GUI can limit performance and speed over a network connection.

Additionally, the conventional CRA can lead to inaccurate results as well as useless results. For example, some identified affected resources such as network ports are inaccurately assigned the critical level because the conventional CRA fails to determine whether the network ports can fail over to other unaffected network ports. Moreover, other identified affected resources are inaccurately assigned the warning level rather than the critical level because the conventional CRA fails to perform sufficient analysis. Furthermore, the conventional CRA report does not provide in a concise manner the information of what resources will be affected and the adverse consequences of proceeding with the online card operation. Consequently, the results in the conventional CRA report can be difficult to understand by the user.

In contrast, the enhanced CRA provides the user (e.g., a system administrator) a better understanding of what resources will be affected if the online card operation were to be performed since the enhanced CRA performs more analysis than that performed by the conventional CRA. The enhanced CRA generates a report that is more accurate, readable, and useable than the conventional CRA report.

Additionally, the enhanced CRA assigns a low severity level, a medium severity level, or a high severity level to the identified affected resource while the conventional CRA assigns only the low severity level or the high severity level to the identified affected resource. The medium severity level enables the user to proceed to the online card operation after providing the user sufficient warning of probable adverse affects that are not likely to cause system downtime and receiving permission from the user to proceed. This allows the user greater warning of possible adverse affects to the system while giving the user the opportunity to continue to the online card operation even if the user is willing to accept some adverse affects that are not likely to cause system downtime, decreasing the likelihood of accidental system downtime. Moreover, the enhanced CRA functionality is accessible from a graphical user interface (GUI) as well from a command line interface (CLI), a terminal user interface (TUI), and a hardware event triggered by an attention button.

Furthermore, the enhanced CRA can provide results in less than a second and in no more than several seconds. This speed is due to the fact that the enhanced CRA does not require performance of the system-wide hardware scan. Instead, the enhanced CRA gathers configuration information independently of performing the system-wide hardware scan and utilizes this configuration information to identify and determine the severity level of each affected resource. The enhanced CRA minimizes the need for information from hardware components of the system. The conventional CRA is slower than the enhanced CRA because the information directly from the hardware components is intrinsically slower to gather.

FIG. 1 illustrates a system 100 in accordance with an embodiment of the present invention, showing a resource analysis unit (RAU) 50. In an embodiment, the system 100 is a computer system (e.g., a server). As depicted in FIG. 1, the system 100 includes a CPU 92, a memory system 62, and one or more buses 90. Additionally, the system 100 includes a plurality of slots Slot 1-Slot N and Slot 76. Slots Slot 1-Slot N have a corresponding power LED (light emitting diode) 2, an attention LED 4, and an attention button 6, which generates a hardware event when pressed. It should be understood that in other configurations for the system 100, some slots may not have a corresponding power LED (light emitting diode) 2, an attention LED 4, or an attention button 6. Moreover, slots Slot 1-Slot N are coupled to the bus 90 via one of lines 82A-82N, respectively. Slot 76 is coupled to the bus 90 via line 81. The CPU 92 is coupled to the bus 90 via line 81A. The memory system 62 is coupled to the bus 90 via line 81B.

A card Card 1-Card N is coupled to a corresponding slot Slot 1-Slot N. The system 100 has mass storage cards Card 1, Card 2, and Card 5. Moreover, the system 100 has network cards Card 3 and Card 4. The system 100 can have other types of cards and configurations. The mass storage device 10 is coupled to Card 1. The mass storage device 20 is coupled to Card 2. The mass storage device 30 is coupled to Card 5. Moreover, the network port A and the network port B are part of Card 3, while the network port C and the network port D are part of Card 4. In an embodiment, the cards Card 1-Card N are compatible with a PCI (Peripheral Component Interface) specification or a PCI-X specification.

Furthermore, Card 74 is coupled to Slot 76 and includes a user input interface 70. In an embodiment, the user input interface 70 supports a command line interface (CLI). In yet another embodiment, the user input interface 70 supports a graphical user interface (GUI). In another embodiment, the user input interface 70 supports a terminal user interface (TUI). In still yet another embodiment, the user input interface 70 supports any combination of a command line interface (CLI), a graphical user interface (GUI), and a terminal user interface (TUI). It is possible for a user to locally or remotely access the command line interface (CLI), the terminal user interface (TUI), and the graphical user interface (GUI).

In an embodiment, the system 100 further includes an online card operation unit 60, which has a resource analysis unit 50. The online card operation unit 60 is coupled to the bus 90 via line 81 C. Moreover, the user input interface 70, the online card operation unit 60, and the resource analysis unit 50 can be implemented as software, hardware, or a combination of hardware and software.

The online card operation unit 60 provides the online card operation functionality intended to sustain system availability. This enables a user (e.g., a system administrator) to perform online card operations without powering down and rebooting the system 100. Examples of online card operations include adding a card to the system 100 by coupling it to a slot, replacing an existing card that is coupled to a slot with another card, and removing a card from the system 100 by uncoupling it from a slot. As described above, the hardware identifier is generally used by the operating system to address devices attached to a card coupled to a slot. Moreover, these online card operations generally require that drivers for the hardware identifiers of interest be suspended and that power to the slot(s) of interest be shut-off before a card can be added, replaced, or removed, while the system 100 is running.

The resource analysis unit 50 provides the enhanced resource analysis of the present invention, wherein the enhanced resource analysis will also be referred to as "enhanced CRA" (enhanced critical resource analysis). In general, before the online card operation is performed, the enhanced CRA is executed. The enhanced CRA can also be performed even if the user does not intend to perform an online card operation. The enhanced CRA analyzes and reports the impact of powering down a slot(s) associated with any card that is involved in any attempted online card operation (e.g., adding, replacing, or removing a card(s)).

Moreover, the resource analysis unit 50 (and the enhanced CRA) has a modular configuration. This enables the user to invoke the enhanced CRA using any one of a plurality of techniques. These techniques include the command line interface (CLI), the graphical user interface (GUI), the terminal user interface (TUI), and a hardware event triggered by the attention button 6.

As will be described in detail below, the enhanced CRA, which is provided by the resource analysis unit 50, has several advantages over the conventional CRA. The enhanced CRA provides the user (e.g., a system administrator) a better understanding of what resources will be affected if the online card operation were to be performed since the enhanced CRA performs more analysis than that performed by the conventional CRA. The enhanced CRA generates a report that is more accurate, readable, and useable than the conventional CRA report.

In general, the enhanced CRA is performed upon an affected hardware identifier or list of affected hardware identifiers. Each affected hardware identifier corresponds to a card on which the enhanced CRA is to be performed. The steps that the enhanced CRA performs are outlined below in detail. If all the cards in question are in a failed state, the user is allowed to proceed with the online card operation since these cards cannot have resources that are essential to system operation because these cards are not providing their functionality to the system 100 and yet the system 100 continues to operate. For example, the card may not be responding while the system 100 continues to operate normally.

The enhanced CRA can be divided into distinct phases. During a set-up phase, the affected hardware identifiers (Ids) list is separated based on card type. From the affected hardware Ids list, two lists are created: a network Ids list, and a mass storage Ids list. The configuration information gathered (as described below) is compared to one of these two lists. If there is a match, there is an affected resource on the card associated with an affected hardware identifier. If there is no match, there is no affected resource on the card associated with an affected hardware identifier, enabling a report to be generated indicating no affected resources were found.

During an analysis phase, configuration information of the system 100 is gathered and compared to the lists generated in the set-up phase. Here, the affected resources are identified and listed according to resource type. Moreover, the network Ids list undergoes an analysis that is different than the analysis undergone by the mass storage Ids list. Unlike the conventional CRA, a hardware scan of the entire system 100 is not required.

During a reporting phase, the identified affected resources are assigned one of a plurality of severity levels based on predetermined criteria. Each severity level represents degree of impact to the system 100 if functionality of the identified affected resource became unavailable. The plurality of severity levels includes a low severity level, a medium severity level, and a high severity level. The low severity level indicates that the unavailability of the identified affected resource is not deemed critical to system operation. The low severity level also is referred as the warning level. The medium severity level indicates that the unavailability of the identified affected resource probably or possibly will cause data loss but will probably not crash the system 100 or cause the system 100 to enter an unhealthy/failed state. However, permission from the user will be required before proceeding to the online card operation. The medium severity level also is referred as the data critical level.

Continuing, the high severity level indicates that the unavailability of the identified affected resource is likely to bring down the system 100. Hence, the user might as well shut down the system 100 and reboot to ensure the system 100 does not enter an unhealthy/failed state. The high severity level also is referred as the system critical level. In this case, the user will not be allowed to proceed with the online card operation. In essence, the enhanced CRA separates the critical level of the conventional CRA into a data critical level and a system critical level, giving the user greater flexibility since the user has the opportunity to proceed to the online card operation if the affected resource is assigned the data critical level but not if the affected resource is assigned the system critical level.

Moreover, in the reporting phase, an enhanced CRA report is generated. The enhanced CRA report has the analysis information in an easy to read format. The enhanced CRA report includes what was checked, what the individual results were, etc. Generally, the results shown in the enhanced CRA report are based on the previously created lists and predetermined criteria for the severity levels. In particular, the enhanced CRA report includes accurate and specific details to provide the user with sufficient information, in an easily understandable manner, of what resources are affected and the adverse consequences of proceeding with the online card operation.

Figure 2:
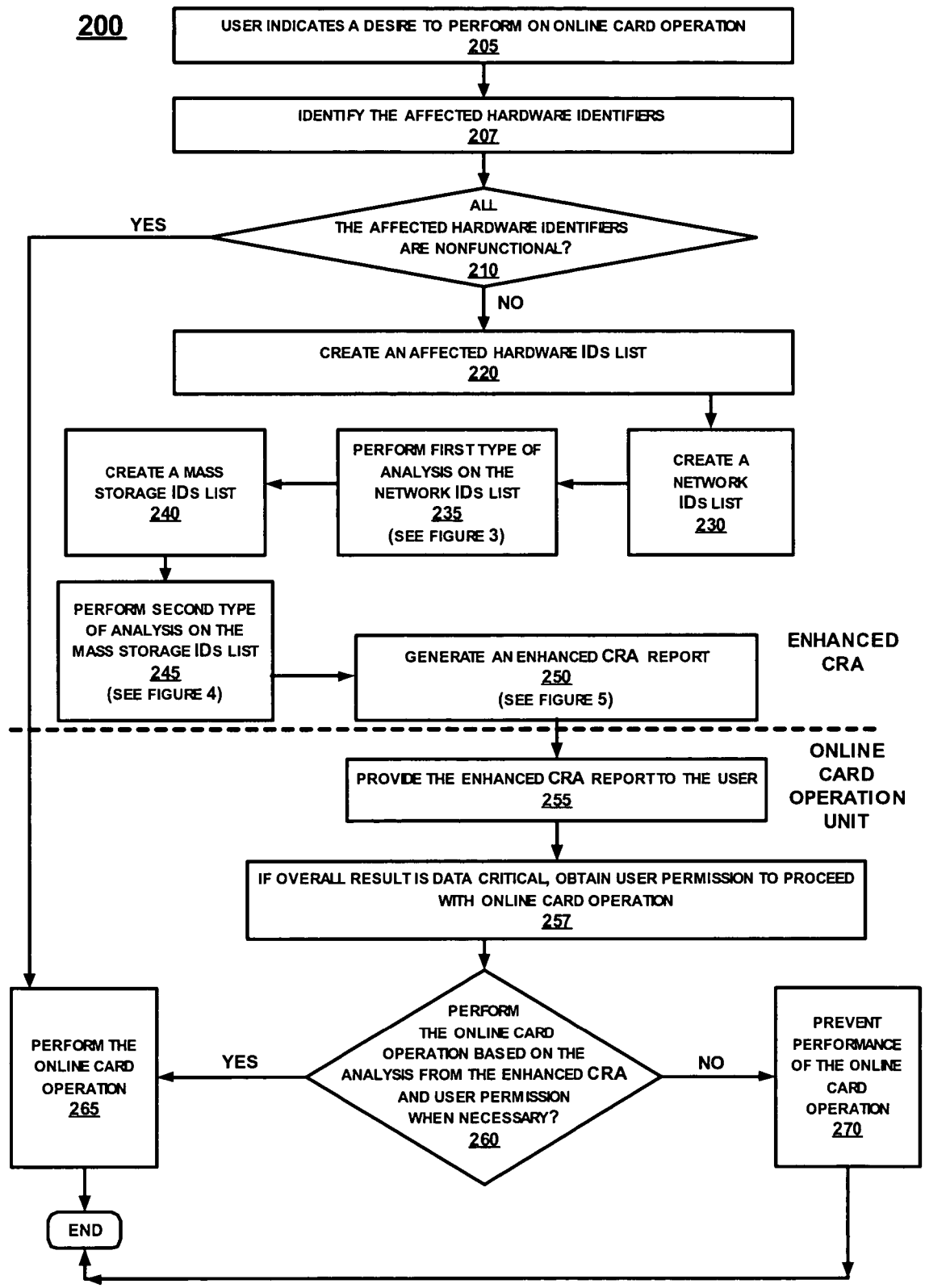
FIG. 2 illustrates a flow chart showing a method of performing resource analysis (which will be referred to as "enhanced CRA") on one or more cards of a system in accordance with an embodiment of the present invention.

FIG. 2 illustrates a flow chart showing a method 200 of performing resource analysis (which will be referred to as "enhanced CRA") on one or more cards of a system 100 (FIG. 1) in accordance with an embodiment of the present invention. In an embodiment, the present invention is implemented as computer-executable instructions for performing this method 200. The computer-executable instructions can be stored in any type of computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

At Step 205, the user indicates a desire to perform an online card operation (e.g., adding, replacing, or removing a card(s)). Here, it is assumed that the user knows which card(s) will be involved in the attempted online card operation. As described above, the online card operation requires suspending drivers to the hardware identifiers associated with the card(s) of interest and powering down the corresponding slot to which the card is coupled. However, if the corresponding slot is in a slot power domain (e.g., several slots sharing a power line), the other slots in the slot power domain will also be powered down. Hence, the cards coupled to these slots also will be involved in the attempted online card operation since these slots are also being powered down.

The user can use a graphical user interface (GUI), a terminal user interface (TUI), or a command line interface (CLI) supported by the user input interface 70 of the system 100 to indicate the desire to perform the online card operation. Alternatively, the user can press the attention button 6 of the slot to trigger a hardware event. Any of these actions activates the online card operation unit 60 to prepare the system 100 for performing the online card operation. In preparing the system 100 for performing the online card operation, the resource analysis unit 50 is invoked, providing accessibility to the enhanced CRA functionality. While the conventional CRA functionality described above is accessible only via a GUI, the enhanced CRA functionality is accessible via the GUI, CLI, TUI, or the hardware event triggered by the attention button 6. It is possible for the user to invoke the enhanced CRA functionality solely to obtain information about a card(s) without intending to proceed with an online card operation.

For explanation purposes, it will be assumed that several cards of the system 100 are involved in or affected by the attempted online card operation.

At Step 207, the affected hardware identifiers are identified, wherein each affected hardware identifier corresponds to any of the cards involved in or affected by the attempted online card operation. Multiple affected hardware identifiers can correspond to the same card. A hardware identifier is generally used by the operating system to address devices attached to a card coupled to a slot. Examples of hardware identifiers and corresponding textual description of cards are shown below:

0/0/1/1—SCSI C896 Ultra Wide Single-Ended

0/0/2/0—SCSI C87x Ultra Wide Single-Ended

Continuing at Step 210, it is determined whether all the affected hardware identifiers are nonfunctional. If all affected hardware identifiers are nonfunctional, there is no need to initiate and perform the enhanced CRA since these affected hardware identifiers cannot be essential to system operation because these affected hardware identifiers are not providing their functionality to the system 100 and yet the system 100 continues to operate normally. Thus, the method 200 proceeds to Step 265, where the user is allowed to proceed with the online card operation. If any of the affected hardware identifiers are functional, the enhanced CRA is fully performed by proceeding to Step 220.

Furthermore, at Step 220, an affected hardware Ids list is created, wherein the enhanced CRA will be performed on this affected hardware Ids list having the identified affected hardware identifiers. Any hardware identifier that is not included in the affected hardware Ids list will not undergo the enhanced CRA.

The affected hardware Ids list is separated based on card type. The affected hardware identifiers corresponding to network cards are identified to create a network Ids list at Step 230. Similarly, the affected hardware identifiers corresponding to mass storage cards are identified to create a mass storage Ids list at Step 240. Hence, from the affected hardware Ids list, two lists are created: the network Ids list at Step 230, and the mass storage Ids list at Step 240. If there are additional card types, the affected hardware identifiers of these additional card types are generally added to the mass storage Ids list (at Step 240) since network card are more readily identifiable. Thus, any of these additional card types may be a type of mass storage card or simply unrelated to a type of mass storage card.

Figure 3:
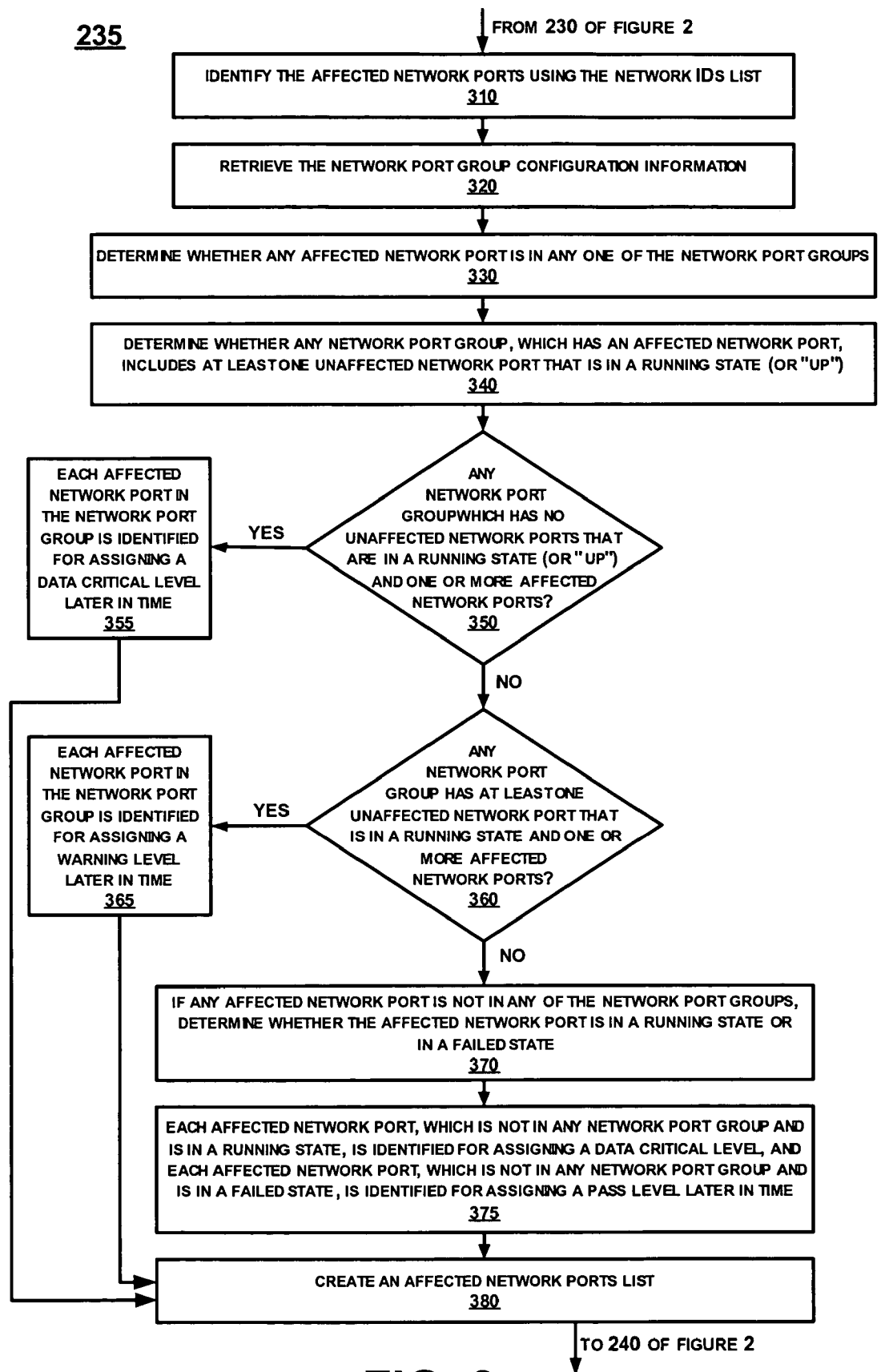
FIG. 3 illustrates a flow chart showing performance of analysis on network Ids list of FIG. 2 in accordance with an embodiment of the present invention.
Figure 4:
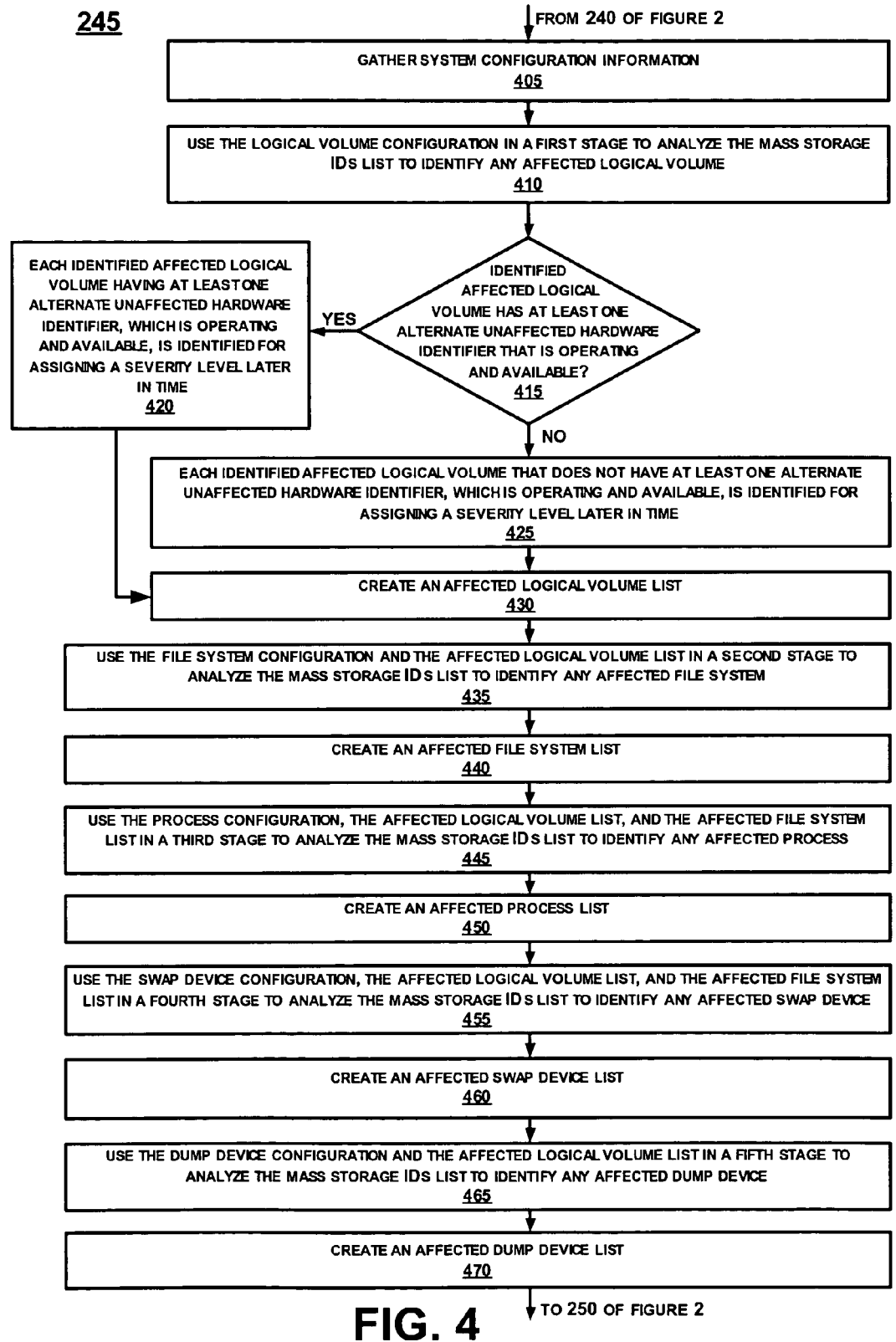
FIG. 4 illustrates a flow chart showing performance of analysis on mass storage Ids list of FIG. 2 in accordance with an embodiment of the present invention.

In accordance with the enhanced CRA, a first type of analysis is performed on the network Ids list at Step 235 to identify affected resources. FIG. 3 describes Step 235 in greater detail. Moreover, at Step 245, a second type of analysis is performed on the mass storage Ids list to identify affected resources. FIG. 4 describes Step 245 in greater detail. The first type of analysis and the second type of analysis are more comprehensive and detailed than the analysis performed by the conventional CRA.

The enhanced CRA uses the approach of gathering system configuration information and determining if any configured resource (identifiable from the system configuration information) is affected based on the affected hardware identifiers. In general, the configured resources would be part of the system configuration information. Unconfigured resources would not be part of the system configuration information and would be unaffected with respect to the analysis performed by the enhanced CRA. This avoids the system-wide hardware scan and other procedures that are performance inhibitors. In analyzing a particular resource, the enhanced CRA converts the particular resource to a hardware identifier and then compares it to either the network Ids list or the mass storage Ids list to determine if the particular resource is affected.

Figure 5:
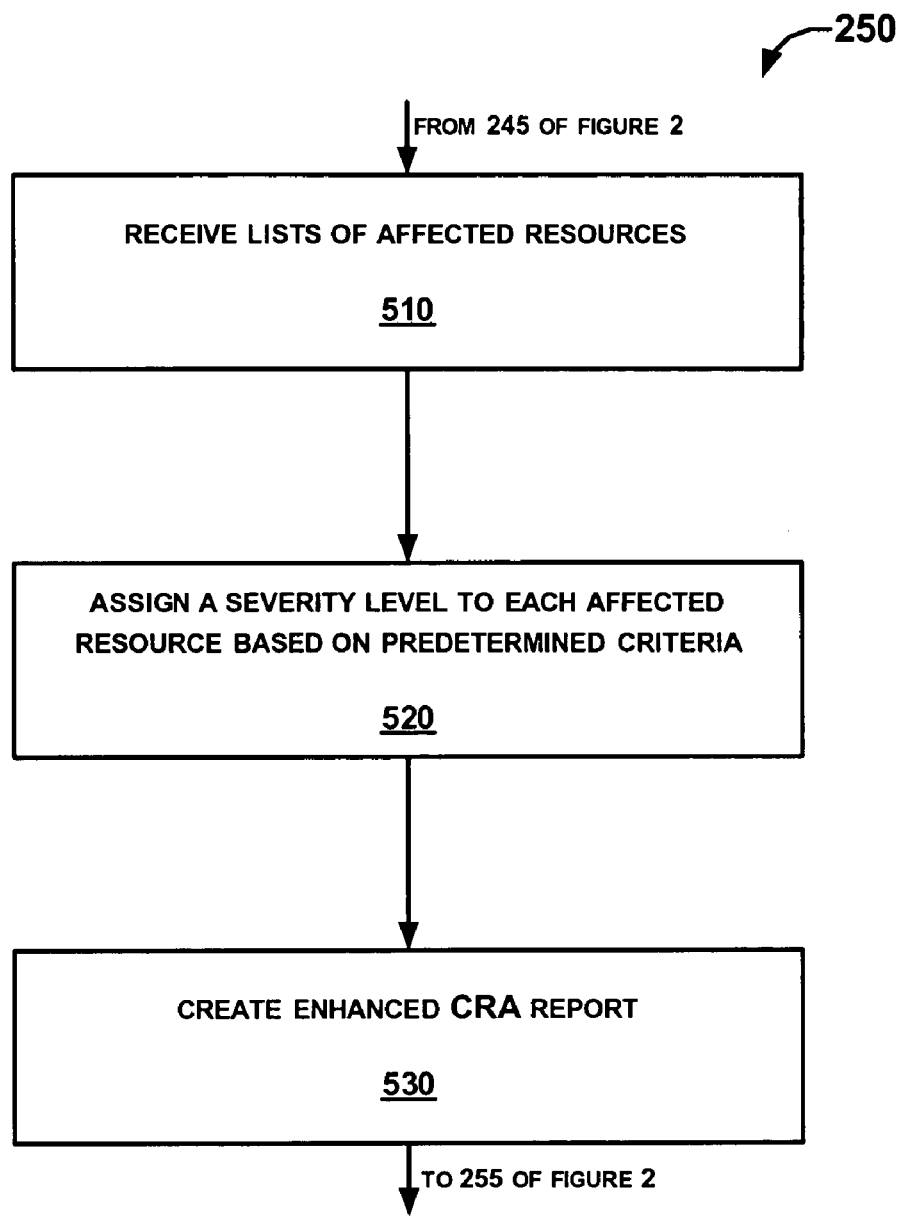
FIG. 5 illustrates a flow chart showing generation of the enhanced CRA report of FIG. 2 in accordance with an embodiment of the present invention.

Continuing at Step 250, the analysis information from Step 245 and from Step 235 is utilized to generate an enhanced CRA report. FIG. 5 describes Step 250 in greater detail. If affected resources are identified in either Step 245 or Step 235, the analysis information includes one or more lists of affected resources separated based on resource type. Generally, the reason for identifying a resource as an affected resource is included in the analysis information. The affected resource is assigned a severity level based on predetermined criteria. The severity levels include a low severity level, a medium severity level, and a high severity level, as described above. Some resource types are assigned any one of these three severity levels. Other resource types are assigned a severity level from a list having a subset of the three severity levels. The enhanced CRA report presents the analysis results in a user-friendly manner that emphasizes accuracy, readability, and providing sufficient information to the user to allow the user to decide whether to permit performance of the online card operation if permission from the user is necessary.

Additionally, the enhanced CRA report provides an overall result of the analysis and reason for the overall result. In an embodiment, the overall result is success, warning, data critical, system critical, or error.

If the overall result is success, this indicates that the enhanced CRA found no affected resources, wherein the user is provided a success message and allowed to proceed to the online card operation.

Furthermore, if the overall result is warning, this indicates that the enhanced CRA found one or more affected resources. However, these affected resources were assigned the low severity level (or warning level) but none were assigned the medium severity level (or data critical level) or the high severity level (or system critical level). The user is provided a warning message stating that the affected resources are not deemed critical to system operation and allowed to proceed to the online card operation.

Continuing, if the overall result is data critical, this indicates that the enhanced CRA found one or more affected resources. However, at least one of these affected resources was assigned the medium severity level (or data critical level) but none were assigned the high severity level (or system critical level). The user is provided a data critical message stating that probably or possibly data stored in the system 100 will be lost but probably the system 100 will not crash or enter an unhealthy/failed state. However, permission from the user will be required before proceeding to the online card operation. This flexibility is provided by the enhanced CRA but not the conventional CRA.

If the overall result is system critical, this indicates that the enhanced CRA found one or more affected resources. However, at least one of these affected resources was assigned the high severity level (or system critical level). The user is provided a system critical message stating that the system 100 is likely to be brought down. Hence, the user might as well shut down the system 100 and reboot to ensure the system 100 does not enter an unhealthy/failed state. In this case, the user will be prevented from proceeding with the online card operation.

Moreover, if the overall result is error, this indicates that the enhanced CRA suffered an internal error, wherein the user is provided an error message and prevented from proceeding to the online card operation.

Starting with Step 255, the online card operation unit 60 proceeds based on the results from the enhanced CRA.

At Step 255, the online card operation unit 60 facilitates providing the enhanced CRA report (see FIG. 6) to the user. If the enhanced CRA has been invoked using a GUI or a CLI or a TUI, the enhanced CRA report is shown to the user via the GUI or the CLI or the TUI, respectively. In an embodiment, if the enhanced CRA has been invoked using a hardware event triggered by the attention button 6, the user will have to access the enhanced CRA report reading a log file, or other alternative manner.

Furthermore, at Step 257, if the overall result is data critical, the online card operation unit 60 obtains permission from the user to proceed with the online card operation.

Continuing, at Step 260, the online card operation unit 60 determines whether to perform the online card operation (e.g., adding, replacing, or removing card(s)) based on the analysis from the enhanced CRA. Moreover, if the overall result in the enhanced CRA report is data critical, the online card operation unit 60 determines whether the user has provided permission to proceed with the online card operation.

If the overall result is success or warning, the online card operation unit 60 facilitates the performance of the online card operation, at Step 265. Additionally, if the overall result is data critical and the user has provided permission to proceed with the online card operation (at Step 257), the online card operation unit 60 facilitates the performance of the online card operation, at Step 265. Moreover, if all the affected hardware identifiers are nonfunctional (as determined at Step 210), the online card operation unit 60 facilitates the performance of the online card operation, at Step 265.

However, if the overall result is system critical or error, the online card operation unit 60 does not proceed with performance of the online card operation, at Step 270. Additionally, if the overall result is data critical and the user has not provided permission to proceed with the online card operation (at Step 257), the online card operation unit 60 does not proceed with performance of the online card operation, at Step 270.

FIG. 3 illustrates a flow chart 235 showing performance of analysis on network Ids list of FIG. 2 in accordance with an embodiment of the present invention. In particular, FIG. 3 describes the Step 235 of FIG. 2 in greater detail.

At Step 310, the affected network ports are identified using the network Ids list. That is, it is determined which network ports are dependent on cards that are involved in any attempted online card operation.

Continuing, at Step 320, the network port group configuration information is retrieved. In general, several network ports can be configured to operate as a network port group for several reasons including providing fail over capability. The network port group behaves as a single network port. That is, if a member of a network port group enters a failed state, another network port(s) (which is in a running state) from the network port group can automatically take up the network communication responsibility being handled by the network port that has entered the failed state. The network port group configuration information can include a plurality of network port groups. In an embodiment, network port group configuration information is AutoPort Aggregation (APA) configuration information in a HP-UX system platform. APA increases a system's efficiency by grouping or "aggregating" multiple network ports into a single link aggregate or fail-over group having a single IP address. Network link failures are decreased, ensuring seamless, continuous operation. Moreover, faster response times can be achieved and frustrating delays can be eliminated.

At Step 330, it is determined whether any affected network port is in any one of the network port groups. Also, first analysis information is generated, wherein as the first analysis information represents the distribution of affected network ports in the network port groups.

Furthermore at Step 340, it is determined whether any network port group, which has an affected network port, includes at least one unaffected network port that is in a running state (or "up"). Second analysis information is generated, wherein the second analysis information represents network port groups having an affected network port and at least one unaffected network port that is in a running state.

Unlike the enhanced CRA, the conventional CRA does not check whether any network port group, which had an affected network port, included no unaffected network port that was in a running state (or "up"). Thus, the user is not informed about the fail over status of the network port groups and is informed that affected network ports are assigned the critical level (even if the user knows that fail over capability is available) rather than the warning level (a more appropriate severity level when fail over capability is available). Additionally, the conventional CRA simply assigns a critical level to the affected network port that supports the GUI used to invoke the conventional CRA functionality.

Moreover, at Step 350 if any network port group has no unaffected network ports that are in a running state (or "up") and one or more affected network ports, the fail over capability to an unaffected network port from an affected network port is eliminated. Hence, each affected network port in the network port group is identified for assigning a data critical level (or medium severity level) later in time, at Step 355.

Also, at Step 360, if any network port group has at least one unaffected network port that is in a running state and one or more affected network ports, the fail over capability to an unaffected network port from an affected network port is maintained. Hence, each affected network port in the network port group is identified for assigning a warning level (or low severity level) later in time, at Step 365.

At Step 370, if any affected network port is not in any of the network port groups, it is determined whether the affected network port is in a running state or in a failed state. Third analysis information is generated, wherein the third analysis information represents whether the affected network port, which is not in any of the network port groups, is in a running state or in a failed state. Here, there is no fail over capability. However, each affected network port, which is not in any network port group and is in a running state, is identified for assigning a data critical level (or medium severity level) later in time, at Step 375. Moreover, each affected network port, which is not in any network port group and is in a failed state, is identified for assigning a pass level later in time, at Step 375. Instead of being a type of severity level, the pass level simply indicates that the affected network port cannot be essential to system operation because the affected network port is not providing its functionality to the system and yet the system continues to operate normally.

Unlike the enhanced CRA, the conventional CRA simply assigns a critical level to the affected network ports that are not in any of the network port groups.

Further, at Step 380, an affected network ports list is created and includes the identified affected network ports and the reason for identifying the affected network ports, wherein the reason can include information from the first, second, and third analysis information.

FIG. 4 illustrates a flow chart 245 showing performance of analysis on mass storage Ids list of FIG. 2 in accordance with an embodiment of the present invention. In particular, FIG. 4 describes the Step 245 of FIG. 2 in greater detail.

At Step 405, system configuration information of the system 100 is gathered independently of a system-wide hardware scan. Generally, the system configuration information includes different types of configuration information. In an embodiment, the system configuration information includes logical volume configuration, file system configuration, process configuration, swap device configuration, and dump device configuration.

In Steps 410-470, a multiple-stage analysis is performed, using the system configuration information, on the mass storage Ids list to identify any affected resource such that any affected resource identified in a current stage is selectively used to identify any additional affected resource in a subsequent stage. As described above, the mass storage Ids list has the affected hardware identifiers corresponding to mass storage cards. Thus, these affected hardware identifiers can correspond to identified affected devices (e.g., disks) coupled to the mass storage cards. Moreover, the identified affected devices can have the affected resources (e.g., logical volume, file system, process, etc.). Additionally, if there are card types other than mass storage cards, the affected hardware identifiers of these card types are generally added to the mass storage Ids list for the reasons described above.

At Step 410, the logical volume configuration is used in a first stage to analyze the mass storage Ids list (which provides the identified affected devices such as identified affected disks) to identify any affected logical volume. During the first stage analysis, a comparison is performed between the affected hardware identifiers of the mass storage Ids list and hardware identifiers of the logical volume configuration to determine a match, which corresponds to an affected logical volume. Even though the mass storage Ids list may have affected hardware identifiers associated with card types other than mass storage cards, these affected hardware identifiers will typically not match any hardware identifier of the logical volume configuration. Thus, a need to assign a severity level to these affected hardware identifiers is avoided.

In an embodiment, the logical volume is compatible with VxVM by Veritas Software Corporation or Logical Volume Manager (LVM). Additionally, any affected volume groups are identified in the first stage. In an embodiment, the analysis will look to determine what mass storage devices (e.g., disks) a volume group has configured and then examine if the mass storage devices are below an affected hardware identifier corresponding to a mass storage card. If mass storage devices are affected, additional logical volume configuration information will be retrieved and the alternate hardware identifier configuration will be considered for the affected logical volumes.

Continuing, at Step 415, it is determined whether any identified affected logical volume has one or more alternate unaffected hardware identifiers. Moreover, it is determined whether at least one alternate unaffected hardware identifier is operating and available. In an embodiment, instead of a system-wide hardware scan, a hardware scan is performed solely on the alternate unaffected hardware identifiers to insure they are still there and functioning. Each identified affected logical volume having at least one alternate unaffected hardware identifier, which is operating and available, is identified for assigning a severity level later in time, at Step 420. Each identified affected logical volume that does not have at least one alternate unaffected hardware identifier, which is operating and available, is identified for assigning a severity level later in time, at Step 425.

Further, at Step 430, an affected logical volume list is created and includes the identified affected logical volumes and identified affected volume groups, and the reason for identifying the affected logical volumes and volume groups.

At Step 435, the file system configuration and the affected logical volume list are used in a second stage to analyze the mass storage Ids list (which provides the identified affected devices such as identified affected disks) to identify any affected file system. Generally, the file system configuration includes locally mounted file system information for the system 100. During the second stage analysis, a comparison is performed between the affected hardware identifiers of the mass storage Ids list and hardware identifiers associated with the file system configuration and the affected logical volume list to determine a match, which corresponds to an affected file system. Even though the mass storage Ids list may have affected hardware identifiers associated with card types other than mass storage cards, these affected hardware identifiers will typically not match any hardware identifier of the file system configuration and the affected logical volume list. Thus, a need to assign a severity level to these affected hardware identifiers is avoided.

Moreover, at Step 440, an affected file system list is created and includes the identified affected file systems and the reason for identifying the affected file system.

Furthermore, at Step 445, the process configuration, the affected logical volume list, and the affected file system list are used in a third stage to analyze the mass storage Ids list (which provides the identified affected devices such as identified affected disks) to identify any affected process. Each identified affected process is a process having an open file on any identified affected file system, any identified affected logical volume, or any identified affected disk. During the third stage analysis, a comparison is performed between the affected hardware identifiers of the mass storage Ids list and hardware identifiers associated with the process configuration, the affected logical volume list, and the affected file system list to determine a match, which corresponds to an affected process. Even though the mass storage Ids list may have affected hardware identifiers associated with card types other than mass storage cards, these affected hardware identifiers will typically not match any hardware identifier of the process configuration, the affected logical volume list, and the affected file system list. Thus, a need to assign a severity level to these affected hardware identifiers is avoided.

Continuing, at Step 450, an affected process list is created and includes the identified affected processes and the reason for identifying the affected process.

At Step 455, the swap device configuration, the affected logical volume list, and the affected file system list are used in a fourth stage to analyze the mass storage Ids list (which provides the identified affected devices such as identified affected disks) to identify any affected swap device. During the fourth stage analysis, a comparison is performed between the affected hardware identifiers of the mass storage Ids list and hardware identifiers associated with the swap device configuration, the affected logical volume list, and the affected file system list to determine a match, which corresponds to an affected swap device. Even though the mass storage Ids list may have affected hardware identifiers associated with card types other than mass storage cards, these affected hardware identifiers will typically not match any hardware identifier of the swap device configuration, the affected logical volume list, and the affected file system list. Thus, a need to assign a severity level to these affected hardware identifiers is avoided.

Furthermore, at Step 460, an affected swap device list is created and includes the identified affected swap devices and the reason for identifying the affected swap devices.

At Step 465, the dump device configuration and the affected logical volume list are used in a fifth stage to analyze the mass storage Ids list (which provides the identified affected devices such as identified affected disks) to identify any affected dump device. During the fifth stage analysis, a comparison is performed between the affected hardware identifiers of the mass storage Ids list and hardware identifiers associated with the dump device configuration and the affected logical volume list to determine a match, which corresponds to an affected dump device. Even though the mass storage Ids list may have affected hardware identifiers associated with card types other than mass storage cards, these affected hardware identifiers will typically not match any hardware identifier of the dump device configuration and the affected logical volume list. Thus, a need to assign a severity level to these affected hardware identifiers is avoided.

At Step 470, an affected dump device list is created and includes the identified affected dump devices and the reason for identifying the affected dump device.

Unlike the enhanced CRA, the conventional CRA performs a system-wide hardware scan to retrieve device information and identify affected devices. Moreover, the conventional CRA simply checks whether any identified affected devices are part of any critical system configuration.

FIG. 5 illustrates a flow chart 250 showing generation of the enhanced CRA report of FIG. 2 in accordance with an embodiment of the present invention. In particular, FIG. 5 describes the Step 250 of FIG. 2 in greater detail.

At Step 510, the created lists are received. The lists include the list created by analyzing the network Ids list at Step 235 (of FIG. 2 and described in greater detail in FIG. 3) and the lists created by analyzing the mass storage Ids list at Step 245 (of FIG. 2 and described in greater detail in FIG. 4). In particular, the lists can include the affected network ports list, the affected logical volume list, the affected file system list, the affected process list, the affected swap device list, and the affected dump device list.

Continuing, at Step 520, a severity level is assigned to each identified affected resource based on predetermined criteria, wherein the severity level represents degree of impact to the system 100 if functionality of the identified affected resource became unavailable. In an embodiment, the severity level is a warning level, a data critical level, or a system critical level. Selection of the predetermined criteria can affect the accuracy of the analysis results.

The following discussion of assigning a severity level is based on the predetermined criteria of an embodiment of the present invention. The assignment of severity level would be different if the predetermined criteria were changed.

The affected network ports identified at Step 355 (FIG. 3) are assigned the data critical level. These affected network ports do not have fail over protection. In particular, these affected network ports are in network port groups that have no unaffected network ports that are in a running state and one or more affected network ports.

Additionally, the affected network ports identified at Step 365 (FIG. 3) are assigned the warning level. These affected network ports have fail over protection. In particular, these affected network ports are in network port groups that have at least one unaffected network port that is in a running state and one or more affected network ports.

The affected network ports identified at Step 375 (FIG. 3) are assigned either the warning level or the data critical level. Each affected network port, which is not in any network port group and is in a running state, is assigned the data critical level. Each affected network port, which is not in any network port group and is in a failed state, is assigned the warning level.

Affected logical volumes that are not being used, affected volume groups having affected disks but no affected logical volumes, and affected logical volumes having at least one alternate unaffected hardware identifier, which is operating and available, are assigned the warning level.

Generally, affected file systems that are locally mounted (e.g., mounted on affected logical volumes which do not have at least one alternate unaffected hardware identifier that is operating and available, or mounted on an affected disk) are assigned the data critical level. However, affected file systems that are found on affected logical volumes having at least one alternate unaffected hardware identifier, which is operating and available, are assigned the warning level. Additionally, the system critical level is assigned to the following affected file systems: /, /stand, /usr, /etc, and FS swap. If / was lost, then there will not be the ability to get into /usr/sbin to power the card back on. If /stand was lost, the kernel registry service will be unable to continue. If /usr was lost, then there will not be the ability to power the card back on. If /etc was lost, the online card operation unit 60 will fail because it cannot write to syslog. If FS swap was lost, the kernel can be swapped out and will panic if it cannot swap itself back in.

Unlike the enhanced CRA, the conventional CRA does not properly warn about possible data loss by affected file systems.

The affected processes are assigned the data critical level. Unlike the enhanced CRA, the conventional CRA does not provide usable information about affected processes since the conventional CRA lacks the data critical level.

Furthermore, the affected swap devices are assigned the system critical level. Loss of a swap device could be catastrophic if the operating system tries to swap information on a defined location no longer available.

The affected dump devices are assigned the warning level. A dump device is not critical to system operation but may be important to a user for troubleshooting.

Referring again to FIG. 5, at Step 530 the enhanced CRA report is created. FIG. 6 depicts an example of the enhanced CRA report. The enhanced CRA report includes each identified resource and corresponding severity level. Moreover, the enhanced CRA report is user-friendly because it emphasizes accuracy, readability, and providing sufficient information to the user to allow the user to decide whether to permit performance of the online card operation if permission from the user is necessary. As described above, the enhanced CRA provides an overall result of the analysis and reason for the overall result. In an embodiment, the overall result is success, warning, data critical, system critical, or error.

FIG. 6 illustrates an enhanced CRA report 600 in accordance with an embodiment of the present invention. As shown in FIG. 6, the enhanced CRA report 600 includes an overall result section 605, a system critical results section 610 having affected resources assigned the system critical level and separated by resource type, a data critical results section 620 having affected resources assigned the data critical level and separated by resource type, and a warning results section 630 having affected resources assigned the warning level and separated by resource type.

The above discussion demonstrates the advantages of the enhanced CRA over the conventional CRA. The features of the enhanced CRA lead to improved system availability, user flexibility, and reduced length of time for analysis.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of performing resource analysis on one or more cards of a computer system, said method comprising:

identifying one or more affected hardware identifiers, wherein each affected hardware identifier corresponds to any of said cards;

gathering configuration information of said computer system;

using said configuration information to analyze said affected hardware identifiers to identify any affected resource of said computer system, wherein said identification of any affected resource is independent of a system-wide hardware scan of said computer system; and assigning one of a plurality of severity levels including a low severity level, a medium severity level, and a high severity level, to each identified affected resource based on predetermined criteria, wherein each severity level represents degree of impact to said computer system if functionality of said identified affected resource became unavailable.

2. The method as recited in claim 1 further comprising:
determining whether to perform an online card operation based on resource analysis information including any identified affected resource and corresponding severity level.

3. The method as recited in claim 2 wherein said determining whether to perform said online card operation comprises:
if none of said identified affected resources is assigned said medium severity level and if none of said identified affected resources is assigned said high severity level, allowing said online card operation to be performed;
if none of said identified affected resources is assigned said high severity level and if at least one of said identified affected resources is assigned said medium severity level, allowing said online card operation to be performed upon receiving permission from a user; and
if at least one of said identified affected resources is assigned said high severity level, preventing said online card operation from being performed.

4. The method as recited in claim 1 further comprising:
if said affected hardware identifiers are nonfunctional before initiating said resource analysis, performing an online card operation without executing said resource analysis.

5. The method as recited in claim 1 wherein said cards are compatible with one of a PCI (Peripheral Component Interface) specification and a PCI-X specification.

6. The method as recited in claim 1 wherein said using said configuration information to analyze said affected hardware identifiers to identify any affected resource of said computer system is performed in a reduced length of time compared to a length of time required to retrieve and use information from said system-wide hardware scan to analyze said affected hardware identifiers to identify any affected resource of said computer system.

7. The method as recited in claim 1 wherein said low severity level is a warning level, wherein said medium severity level is a data critical level, and wherein said high severity level is a system critical level.

8. The method as recited in claim 1 further comprising:
if no affected resource is identified, sending a success message to a user.

9. A method of performing resource analysis on one or more cards of a computer system, said method comprising:
identifying one or more affected hardware identifiers, wherein each affected hardware identifier corresponds to any of said cards;
identifying any affected storage hardware identifiers to form a mass storage Ids list, wherein each affected storage hardware identifiers is an affected hardware identifier corresponding to a mass storage card;
gathering system configuration information of said computer system, wherein said system configuration information includes different types of configuration information;
performing a multiple-stage analysis, using said system configuration information, on said mass storage Ids list to identify any affected resource such that any affected resource identified in a current stage is selectively used to identify any additional affected resource in a subsequent stage; and
assigning one of a plurality of severity levels to each identified affected resource based on predetermined criteria, wherein each severity level represents degree of impact to said computer system if functionality of said identified affected resource became unavailable.

10. The method as recited in claim 9 wherein said system configuration information includes logical volume configuration, file system configuration, process configuration, swap device configuration, and dump device configuration.

11. The method as recited in claim 10 wherein said performing said multiple-stage analysis comprises:
using said logical volume configuration in a first stage to analyze said mass storage Ids list to identify any affected logical volume, wherein said mass storage Ids list identifies each affected disk;
using said file system configuration and any identified affected logical volume in a second stage to analyze said mass storage Ids list to identify any affected file system;
using said process configuration, any identified affected logical volume, and any identified affected file system in a third stage to analyze said mass storage Ids list to identify any affected process;
using said swap device configuration, any identified affected logical volume, and any identified affected file system in a fourth stage to analyze said mass storage Ids list to identify any affected swap device; and
using said dump device configuration and any identified affected logical volume in a fifth stage to analyze said mass storage Ids list to identify any affected dump device.

12. The method as recited in claim 11 wherein each identified affected process is a process having an open file on one of any identified affected file system, any identified affected logical volume, and any identified affected disk.

13. The method as recited in claim 11 further comprising:
determining whether any identified affected logical volume has one or more alternate unaffected hardware identifiers; and
if said identified affected logical volume has one or more alternate unaffected hardware identifiers, determining whether at least one alternate unaffected hardware identifier is operating and available.

14. The method as recited in claim 11 wherein said plurality of severity levels includes a low severity level, a medium severity level, and a high severity level.

15. The method as recited in claim 14 wherein each identified affected file system is assigned one of said low severity level, said medium severity level, and said high severity level, wherein each identified affected process is assigned a medium severity level, wherein each identified affected swap device is assigned a high severity level, and wherein each identified affected dump device is assigned a low severity level.

16. The method as recited in claim 9 further comprising:
determining whether to perform an online card operation based on resource analysis information including any identified affected resource and corresponding severity level, and wherein said plurality of severity levels includes a low severity level, a medium severity level, and a high severity level.

17. The method as recited in claim 16 wherein said determining whether to perform said online card operation comprises:
if none of said identified affected resources is assigned said medium severity level and if none of said identified affected resources is assigned said high severity level, allowing said online card operation to be performed;

if none of said identified affected resources is assigned said high severity level and if at least one of said identified affected resources is assigned said medium severity level, allowing said online card operation to be performed upon receiving permission from a user; and if at least one of said identified affected resources is assigned said high severity level, preventing said online card operation from being performed.

18. The method as recited in claim 16 wherein said low severity level is a warning level, wherein said medium severity level is a data critical level, and wherein said high severity level is a system critical level.

19. The method as recited in claim 9 further comprising:
if said affected hardware identifiers are nonfunctional before initiating said resource analysis, performing an online card operation without executing said resource analysis.

20. The method as recited in claim 9 wherein said cards are compatible with one of a PCI (Peripheral Component Interface) specification and a PCI-X specification.

21. The method as recited in claim 9 further comprising:
if no affected resource is identified, sending a success message to a user.

* * * * *